United States Patent [19]
Hori et al.

[11] Patent Number: 5,227,193
[45] Date of Patent: Jul. 13, 1993

[54] METHOD FOR MANUFACTURING MAGNETIC HEAD

[75] Inventors: Tohru Hori, Ikoma; Akihiro Ashida, Yao; Ken Takahashi, Osaka, all of Japan

[73] Assignee: Matsushita Electric Industrial Co., Ltd.

[21] Appl. No.: 769,852

[22] Filed: Oct. 2, 1991

[30] Foreign Application Priority Data

| | | |
|---|---|---|
| Oct. 2, 1990 [JP] | Japan | 2-265651 |
| Oct. 11, 1990 [JP] | Japan | 2-273940 |
| Nov. 19, 1990 [JP] | Japan | 2-313511 |
| Jan. 28, 1991 [JP] | Japan | 3-8326 |
| Apr. 26, 1991 [JP] | Japan | 3-97162 |

[51] Int. Cl.$^5$ ............................................. G11B 5/42
[52] U.S. Cl. ................................... 427/131; 29/603; 360/119; 360/127; 427/132
[58] Field of Search ................. 29/603; 427/131, 132; 360/119-121, 125-127

[56] References Cited

U.S. PATENT DOCUMENTS 5,016,341  5/1991  Ogawa et al. ................. 29/603

*Primary Examiner*—Carl E. Hall
*Attorney, Agent, or Firm*—Wenderoth, Lind & Ponack

[57] ABSTRACT

A method for manufacturing a magnetic head of a metal-in-gap type in which a soft magnetic film is provided in a gap of a ferrite core comprising the steps of: forming a first layer comprising a metallic magnetic film containing nitrogen on magnetic ferrite; forming a second layer comprising a metallic magnetic film containing nitrogen in an amount less than said first layer; and forming a third layer comprising a metallic magnetic film containing nitrogen in an amount more than said second layer.

14 Claims, 7 Drawing Sheets

METHOD FOR MANUFACTURING MAGNETIC HEAD

BACKGROUND OF THE INVENTION

1. Field of the Invention

The present invention relates to a magnetic head, and more particularly, to a method for manufacturing a magnetic head of a MIG type in which a magnetic material of a high saturation magnetic flux density and a high magnetic permeability is provided in the magnetic gap.

2. Description of the Related Arts

In recent years, improvements in video, acoustic, and information equipment have been remarkably progressing. Magnetic recording plays a very important role in these equipments. Accordingly, there are growing demands for the development of magnetic recording technology. For example, the development of technology for carrying out a high density recording is strongly demanded. As a result, the recording medium of these equipments have increased in magnetic coercive force. A conventional magnetic head made of ferrite is not enough to record a signal favorably on a medium having such a high magnetic coercive force. Therefore, researches have been made on a metallic soft magnetic materials of a high saturation magnetic flux density such as Sendust, Co-base amorphous, and Fe-base alloy. Further, magnetic heads of various types, such as laminated types or thin film types, which are made of these metallic soft magnetic material, have been energetically developed.

A magnetic head of a metal-in-gap (MIG) type is superb in that it is low in manufacturing cost and preferably has wear resistance. The above-described MIG head means that a magnetic head made of ferrite in which a metallic magnetic material of a high saturation magnetic flux density and a high magnetic permeability is provided in the magnetic gap. Of MIG heads, a MIG head of a parallel gap type particularly has a favorable productivity, namely, a magnetic head in which the magnetic gap is parallel with the boundary surface between the ferrite and the metallic magnetic film of a high saturation magnetic flux density and a high magnetic permeability. But the parallel gap type MIG head is inferior in practicability in that a pseudo signal is produced due to the generation of a pseudo gap in the boundary region between the ferrite and the metallic magnetic film caused by reaction or diffusion in heat treatment. But recently, researches have been made to manufacture a metallic film which is hardly diffused and hardly reacts with the ferrite or the nonmagnetic reaction preventing film. The parallel gap type MIG heads comprising such films are practically used, which is described in, for example, "Japanese applied magnetics society magazine", 12, 103–106 (1988) or 13, 277–280 (1989).

The conventional parallel gap type MIG head has a disadvantage in its structure in the metallic magnetic film of a high saturation magnetic flux density and a high magnetic permeability in practical use does not have the necessary reactivity or only exhibits the property of diffusion in a slight degree. Accordingly, it is necessary to provide a parallel gap type MIG head comprising such a metallic magnetic film with a composition suitable for the metallic magnetic film. Otherwise, it is necessary to form a reaction preventing layer between the metallic magnetic film and the ferrite. If the reaction preventing layer is nonmagnetic, the reaction preventing layer itself serves as a magnetic gap. Consequently, the reaction preventing layer causes a pseudo gap.

SUMMARY OF THE INVENTION

Accordingly, an essential object of the present invention is to provide a parallel gap type MIG head, of a high performance, comprising a metallic magnetic film of high saturation magnetic flux density and a high magnetic permeability. More specifically, it is an object of the present invention to provide a parallel gap type MIG head, the property of which can be maintained by preventing the generation of a pseudo signal without providing the magnetic head with a reaction preventing layer so that the magnetic head has preferable productivity and electromagnetic conversion characteristics.

In accomplishing these and other objects, according to the present invention, there is provided a method for manufacturing a magnetic head of a metal-in-gap type in which a soft magnetic film is provided in a gap of a core made of magnetic ferrite comprising the steps of: forming a first layer, which composes a metallic magnetic film containing nitrogen, on the core; forming a second layer, which composes a metallic magnetic film containing nitrogen in an amount less than the first layer, on the first layer; and forming a third layer, which composes a metallic magnetic film containing nitrogen in an amount more than the second layer, on the second layer.

According to the method, the reaction between the ferrite and the metallic soft magnetic material, which may be caused by a heat treatment, can be suppressed without providing a reaction preventing layer between the metallic soft magnetic material and the ferrite, while the magnetic head is being manufactured. In the method according to the present invention, metal nitride is formed in the second layer having a small amount of nitrogen. The metal nitride prevents the reaction between the metal magnetic material and the ferrite. A metallic magnetic material of a high saturation magnetic flux density and a high magnetic permeability in practical use can be applied to a parallel type MIG head which has a simple construction and is easy to produce without the generation of a pseudo gap.

BRIEF DESCRIPTION OF THE DRAWINGS

These and other objects and features of the present invention will become clear from the following description taken in conjunction with the preferred embodiments thereof with reference to the accompanying drawings, in which.

DESCRIPTION OF THE PREFERRED EMBODIMENTS

Figure 1:
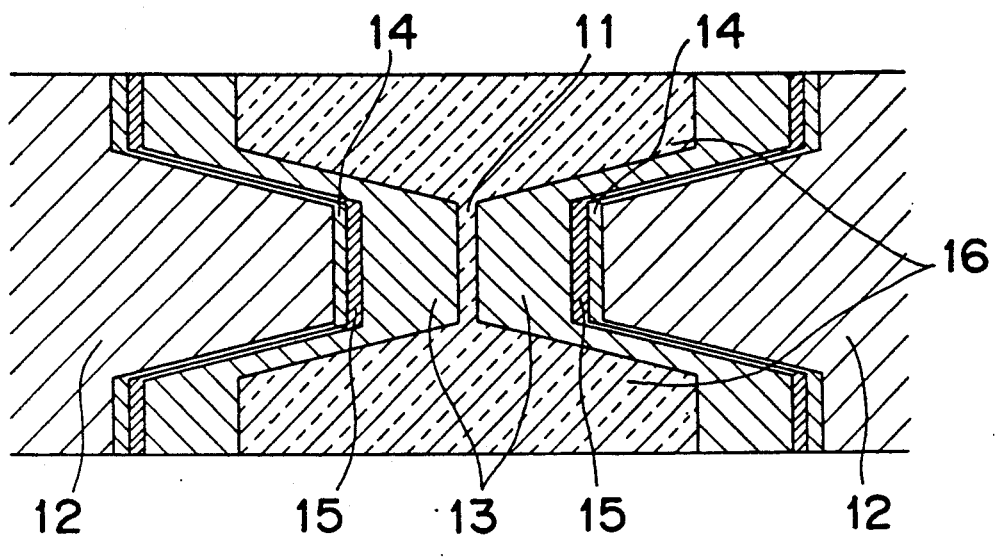
FIG. 1 is an end view showing the vicinity of the gap of a sliding surface of a MIG type magnetic head, manufactured by the manufacturing method of the present invention, in which a metallic magnetic film containing nitrogen is provided in the gap of a ferrite core.

Before the description of the present invention proceeds, it is to be noted that like parts are designated by like reference numerals throughout the accompanying drawings.

Referring now to the accompanied drawings, the embodiments of the present invention will be described below.

The common feature of the embodiments of the method for manufacturing a magnetic head according to the present invention is briefly described below.

First, a magnetic ferrite core 12 having a track formed thereon is prepared. Then, the ferrite core 12 is set on an RF magnetron sputtering device. A target consisting of a metallic magnetic material is set on the sputtering device beforehand. Inert gas such as argon is supplied to the sputtering device when a metallic magnetic film 13 is deposited on the ferrite core 12. At the first stage of the deposition of the metallic magnetic film 13 on the ferrite core 12, nitrogen gas and argon are supplied to form a metallic film 14 containing nitrogen on the ferrite core 12. Then, nitrogen gas is supplied to the sputtering device in a reduced amount or not supplied thereto to form a metallic film 15 not containing much amount of nitrogen on the metallic film 14. Thereafter, nitrogen gas is supplied again to form the metallic film 14.

When the metallic magnetic film 13 is a nitride film, the supply of nitrogen is continued to form the metallic nitride film in a desired thickness. FIG. 1 shows the vicinity of a main gap 11 of a sliding surface of a magnetic head, formed by using a mold glass 16, comprising a pair of cores thus manufactured.

Figure 2:
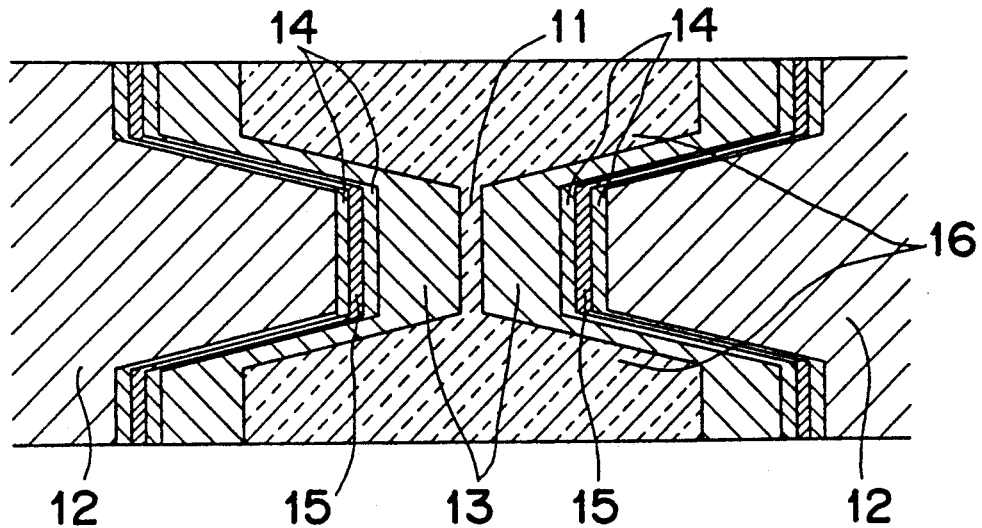
FIG. 2 is an end view showing the vicinity of the gap of a sliding surface of a MIG type magnetic head, manufactured by the manufacturing method of the present invention, in which a metallic magnetic film not containing nitrogen is provided in the gap of a ferrite core.

When the metallic magnetic film 13 is a non-nitride film, the supply of nitrogen is stopped to form a non-nitride metallic film in a desired thickness. FIG. 2 is the vicinity of the main gap 11 of a sliding surface of a magnetic head, formed by using the mold glass 16, comprising a pair of cores thus manufactured.

It is to be noted that the distribution of nitrogen may be eliminated by the diffusion after the heat treatment, depending on the composition of a metallic magnetic material.

EXAMPLE 1

Figure 3:
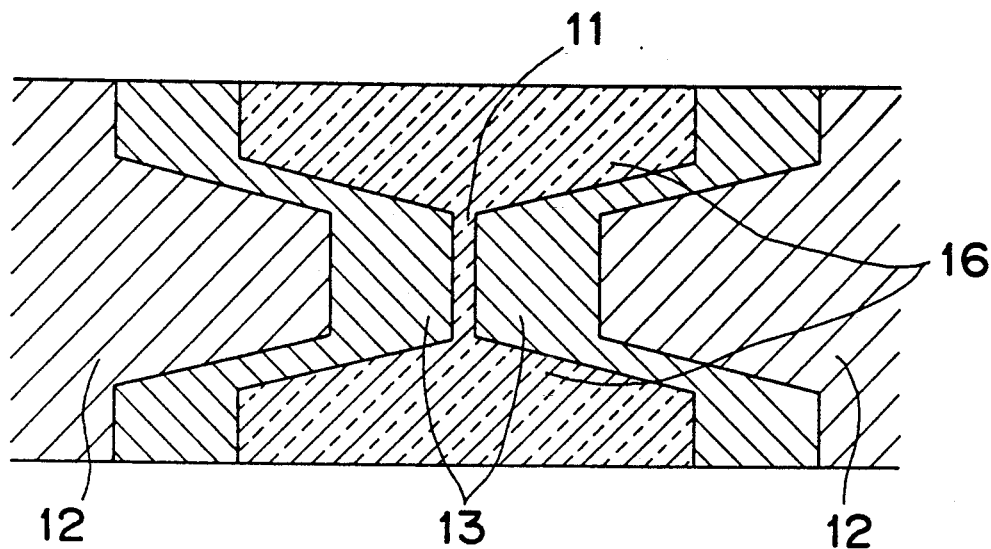
FIG. 3 is an end view showing the vicinity of a sliding surface of a conventional MIG type magnetic head.
Figure 4:
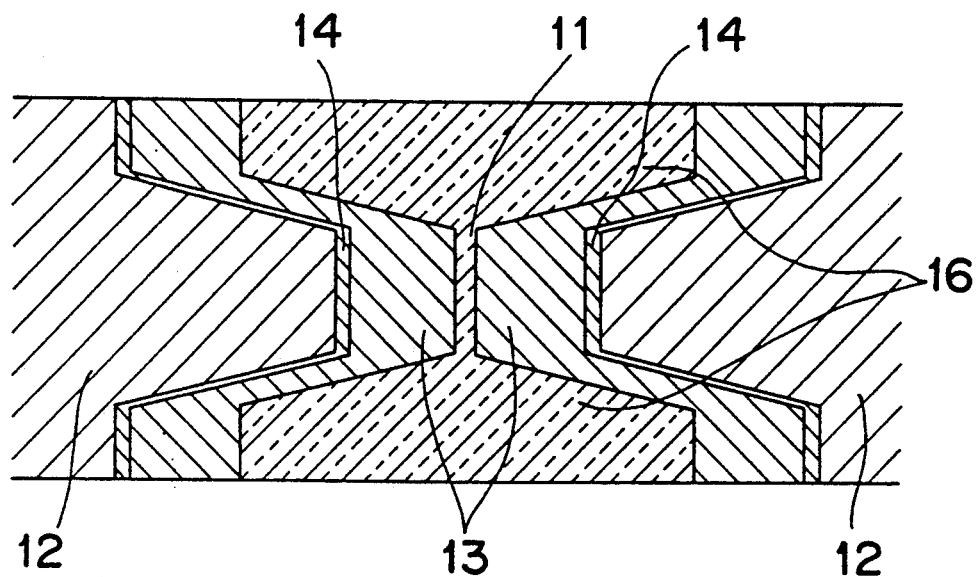
FIG. 4 is an end view showing the vicinity of the gap of a sliding surface of a MIG type magnetic head in which a soft magnetic film not containing nitrogen is provided in the gap of a ferrite core through a first nitride layer.

Referring to Table 1, a magnetic head, as shown in FIG. 1, comprising CoNbZr used as the target of a metallic magnetic material is denoted by reference numeral 1, and a magnetic head, as shown in FIG. 2, comprising CoNbZrTa used as the target of the metallic magnetic material is denoted by reference numeral 2. As a comparative example of the magnetic head 1, a conventional magnetic head, as shown in FIG. 3, manufactured by using the same target is denoted by reference numeral 3. The magnetic head 3 does not have a nitrogen-scarce layer 15 as shown in FIG. 1. As a comparative example of the magnetic head 2, a magnetic head, as shown in FIG. 4, manufactured by using the same target is denoted by reference numeral 4. In the magnetic head 4, only a nitrogen-abundant layer 14 is provided between ferrite 12 and the metallic magnetic material 13. Similarly to FIGS. 1 and 2, FIGS. 3 and 4 show the vicinity of the main gap of the sliding surface of each magnetic head 3 and 4.

The thickness of the metallic magnetic film 13 of each magnetic head 1, 2, 3, and 4 is 4.2 μm. The thickness of the nitrogen-abundant layer 14 and nitrogen-scarce layer 15 is 27 nm, respectively. The partial pressure of nitrogen gas at the time of the formation of the nitrogen-abundant layer 14 is 10% of the total pressure. The supply of nitrogen gas is stopped during the formation of the nitrogen-scarce layer 15. The magnetic gap is formed through a heat treatment at 550° C. for 60 minutes.

Table 1 shows pseudo outputs and waving in frequency response at a magnetomotive force of 550 mA.-turn and a writing frequency of 65 kHz when the relative speed of a magnetic recording medium relative to the magnetic heads 1, 2, 3, and 4 is 3.1 m/s. A tape used as the magnetic recording medium in the embodiments of the present invention has metal powders applied thereto. The pseudo output is the ratio of an output ($V_G$) at a pseudo gap to an output ($V_M$) at a main gap.

TABLE 1

| head | head 1 | head 2 | head 3 | head 4 |
| --- | --- | --- | --- | --- |
| pseudo output (dB) | −36 | −36 | −14 | −24 |
| waving in frequency response (dB p-p) | 0.4 | 0.4 | 7 | 2 |

Table 1 indicates that in MIG magnetic heads of parallel gap type, the pseudo output of a conventional magnetic head 3 is −14 dB while that of the magnetic head 1 of the present invention is −36 dB. That is, the influence of the pseudo gap on the operation of the magnetic head according to the present invention is smaller than the influence of the pseudo gap on the operation of the conventional magnetic head. In MIG heads of parallel gap type, the pseudo output of the magnetic head 4 comprising a soft magnetic film not containing nitrogen, ferrite, and a nitride layer formed therebetween is −24 dB while that of the magnetic head 2 of the present invention is −36 dB. That is, the influence of the pseudo gap on the operation of the magnetic head of the present invention is smaller than the influence of the pseudo gap on the operation of the magnetic head 4.

As described above, first, a first metallic layer containing nitrogen is formed on magnetic ferrite, then, a second metallic layer not containing much nitrogen is formed on the first metallic layer, and thereafter, a third metallic layer containing nitrogen is formed on the second metallic layer. A metallic magnetic film of a high saturation magnetic flux density and a high magnetic permeability can be applied to a parallel gap type MIG head which has a simple construction and is easy to produce with the diffusion of elements between the soft magnetic film and ferrite suppressed. Thus, a MIG head is influenced in a small degree by the pseudo gap in its operation.

EXAMPLE 2

Referring to Table 2, a magnetic head, shown in FIG. 1, manufactured by using FeNb as the target of a metallic magnetic material is denoted by reference numeral 5. A magnetic head, as shown in FIG. 2, manufactured by using FeAlSi as the target of a metallic magnetic material is denoted by reference numeral 6. A conventional magnetic head serving as a comparative example of the magnetic head 5, as shown in FIG. 3, manufactured by using the same target is denoted by reference numeral 7. The magnetic head 7 does not have the nitrogen-scarce layer 15 as shown in FIG. 1. A magnetic head serving as a comparative example of the head 6, shown in FIG. 4, manufactured by using the same target is denoted by reference numeral 8. The magnetic head 8 comprises ferrite 12, the metallic magnetic material 13, and the nitrogen-abundant layer 14 formed therebetween.

The thickness of the metallic magnetic film 13 of each magnetic head 5, 6, 7, and 8 is 4.1 μm. The thickness of the nitrogen-abundant layer 14 and nitrogen-scarce layer 15 is 27 nm, respectively. The partial pressure of nitrogen gas at the time of the formation of the nitrogen-abundant layer 14 is 10% of the total pressure. The supply of nitrogen gas is stopped during the formation of the nitrogen-scarce layer 15. The magnetic gap is formed through a heat treatment at 550° C. for 60 minutes.

Table 2 shows the pseudo outputs and waving in frequency response at a magnetomotive force of 550 mA.turn and a writing frequency of 65 kHz when the relative speed of a magnetic recording medium relative to the magnetic heads 5, 6, 7, and 8 is 3.1 m/s.

TABLE 2

| head | head 5 | head 6 | head 7 | head 8 |
| --- | --- | --- | --- | --- |
| pseudo output (dB) | −31 | −34 | −16 | −20 |
| waving in frequency response (dB p-p) | 0.5 | 0.4 | 6 | 3 |

Table 2 indicates that in MIG magnetic heads of parallel gap type, the pseudo output of a conventional magnetic head 7 is −16 dB while that of the magnetic head 5 of the present invention is −31 dB. That is, the influence of the pseudo gap on the operation of the magnetic head according to the present invention is smaller than the influence of the pseudo gap on the operation of the conventional magnetic head. In MIG heads of parallel gap type, the pseudo output of the magnetic head 8 comprising a soft magnetic film not containing nitrogen, ferrite, and a nitride layer formed therebetween is −20 dB while that of the magnetic head 6 of the present invention is −34 dB. That is, the influence of the pseudo gap on the operation of the magnetic head of the present invention is smaller than the influence of the pseudo gap on the operation of the magnetic head 8.

As described above, similarly to example 1, first, a first metallic layer containing nitrogen is formed on magnetic ferrite, then, a second metallic layer not containing much nitrogen is formed on the first metallic layer, and thereafter, a third metallic layer containing nitrogen is formed on the second metallic layer. A metallic magnetic film of a high saturation magnetic flux density and a high magnetic permeability can be applied to a parallel gap type MIG head which has a simple construction and is easy to produce with the diffusion of elements between the soft magnetic film and ferrite suppressed. Thus, a MIG head is influenced in a small degree by the pseudo gap in its operation.

EXAMPLE 3

In the magnetic head, as shown in FIG. 2, manufactured by using CoNbZr as the target of the metallic magnetic material, the thickness of the nitrogen-abundant layer 14 which is the first layer adjacent to ferrite 12 and that of the nitrogen-scarce layer 15 which is the second layer adjacent to the nitrogen-abundant layer are varied. Table 3 shows the relationship between the depth of the diffusion of oxygen of ferrite into the metallic magnetic film in the boundary region between the metallic magnetic film and ferrite of each of these magnetic heads and the thickness of the nitrogen abundant layer as well as that of the nitrogen-scarce layer. The diffusion depth of oxygen of the ferrite into a soft magnetic film is measured by an Auger electron spectral analysis, i.e., the diffusion depth of oxygen is indicated by the distance between a position at which the energy intensity of an Auger electron emitted from an oxygen atom is below the noise level and the boundary surface between the metallic magnetic film and the ferrite.

TABLE 3

| nitrogen-abundant layer thickness (nm) | nitrogen-scarce layer thickness (nm) | diffusion depth thickness (nm) |
|---|---|---|
| 3.0 | 3.0 | 170 |
| 5.0 | 5.0 | 10 |
| 10 | 5.0 | 11 |
| 5.0 | 10 | 30 |
| 10 | 10 | 6 |
| 7.0 | 27 | 40 |
| 13.15 | 27 | 4 |
| 27 | 27 | 3 |
| 100 | 27 | 110 |
| 300 | 27 | 280 |
| 400 | 27 | 340 |
| 50 | 50 | 30 |
| 100 | 50 | 80 |
| 100 | 100 | 70 |
| 200 | 200 | 130 |

As shown in Table 3, the diffusion degree of oxygen of ferrite into the soft magnetic film is great if the nitrogen-abundant layer, which composes the soft magnetic film, adjoining the ferrite is too thin or too thick. If the thickness (A) of the nitrogen-abundant layer and the thickness (B) of the nitrogen-scarce layer are in the range of 5 nm<A<300 nm and 5 nm<B<300 nm, respectively, the diffusion degree of oxygen of the ferrite between the metallic magnetic film and ferrite is small.

Table 4 shows pseudo outputs and the dependency of the waving in frequency response on the layer thickness at a magnetomotive force of 550 mA.turn and a writing frequency of 65 kHz when the relative speed of a magnetic recording medium relative to a magnetic head, having the characteristics as shown in Table 3, is heat-treated at 550° C. is 3.1 m/s.

TABLE 4

| nitrogen-abundant layer thickness (nm) | 5.0 | 7.0 | 13.5 | 300 |
|---|---|---|---|---|
| nitrogen-scarce layer thickness (nm) | 5.0 | 27 | 27 | 27 |
| pseudo output (dB) | −24 | −22 | −36 | −32 |
| waving in frequency response (dB p-p) | 2.6 | 2.2 | 0.7 | 0.9 |

In the magnetic head having the characteristic as shown in Table 4, the total thickness of the metallic magnetic film 13 is 4 μm and the average composition ratio of Nb, Zr, N, and Co is 6%, 2.5%, 5.5%, and the rest, respectively in atomic percentage.

As indicated in Table 4, the diffusion degree of oxygen of ferrite between the metallic magnetic film and the ferrite is small if the thickness (A) of the nitrogen-abundant layer and the thickness (B) of the nitrogen-scarce layer are 5 nm<A<300 nm and 5 nm<B<300 nm, respectively. In this case, the influence of the pseudo gap on the operation of the magnetic head is small.

As described above, first, a first metallic layer containing nitrogen is formed on magnetic ferrite, then, a second metallic layer not containing much nitrogen is formed on the first metallic layer, and thereafter, a third metallic layer containing nitrogen is formed on the second metallic layer and the thickness (A) of the nitrogen-abundant layer and the thickness (B) of the nitrogen-scarce layer are 5 nm<A<300 nm and 5 nm<-B<300 nm, respectively. Thus, a metallic magnetic film of a high saturation magnetic flux density and a high magnetic permeability can be applied to a parallel gap type MIG head which has a simple construction and is easy to produce with the diffusion of elements between the soft magnetic film and ferrite suppressed. Thus, a MIG head is influenced in a small degree by the pseudo gap in its operation.

EXAMPLE 4

In the magnetic head, as shown in FIG. 2, manufactured by using CoNbZr as the target of the metallic magnetic material, the thickness of the nitrogen-abundant layer, which composes the metallic magnetic film, adjoining the ferrite is varied. Table 5 shows pseudo outputs and the dependency of the waving in frequency response on composition ratio at a magnetomotive force of a 550 mA.turn and the writing frequency of 65 kHz, when the relative speed of the magnetic recording medium relative to the magnetic head is heat-treated at 550° C. is 3.1 m/s.

TABLE 5

| nitrogen amount | 1 | 3 | 4 | 5 | 11 | 30 | 40 | 50 |
|---|---|---|---|---|---|---|---|---|
| pseudo signal (dB) | −12 | −21 | −24 | −32 | −38 | 34 | −28 | −16 |
| waving in frequency response (dB p-p) | 4.2 | 2.2 | 2.4 | 1.0 | 0.6 | 0.6 | 1.2 | 4 |

In the magnetic head having the characteristic as shown in Table 5, the thickness of the nitrogen-abundant layer and the nitrogen-scarce layer is 27 μm, the total thickness of the metallic magnetic film 13 is 5.4 μm, and the average composition ratio of Nb, Zr, N, and Co is 6%, 2.5%, 5.5%, and the rest, respectively in atomic percentage immediately after the above layers are formed. Table 5 indicates that the influence of the pseudo gap on the operation of the magnetic head is small if the composition ratio of nitrogen of the first layer, which composes the metallic magnetic film, adjoining the ferrite is greater than the average composition ratio of nitrogen contained in the metallic magnetic film and smaller than 50%.

Figure 5:
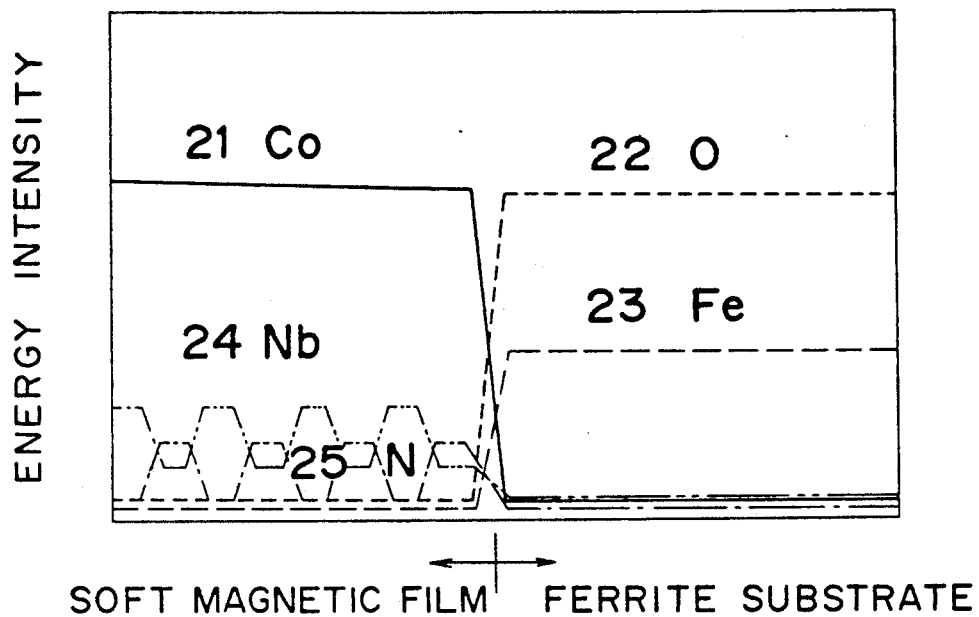
FIG. 5 is a graphical representation showing the distribution condition of each element of a soft magnetic film in the film thickness direction thereof measured by an Auger electron spectral analysis immediately after the soft magnetic film is formed, in which the composition ratio of nitrogen of a first layer adjacent to ferrite is more than the average composition ratio of nitrogen of the soft magnetic film and less than 50%.
Figure 6:
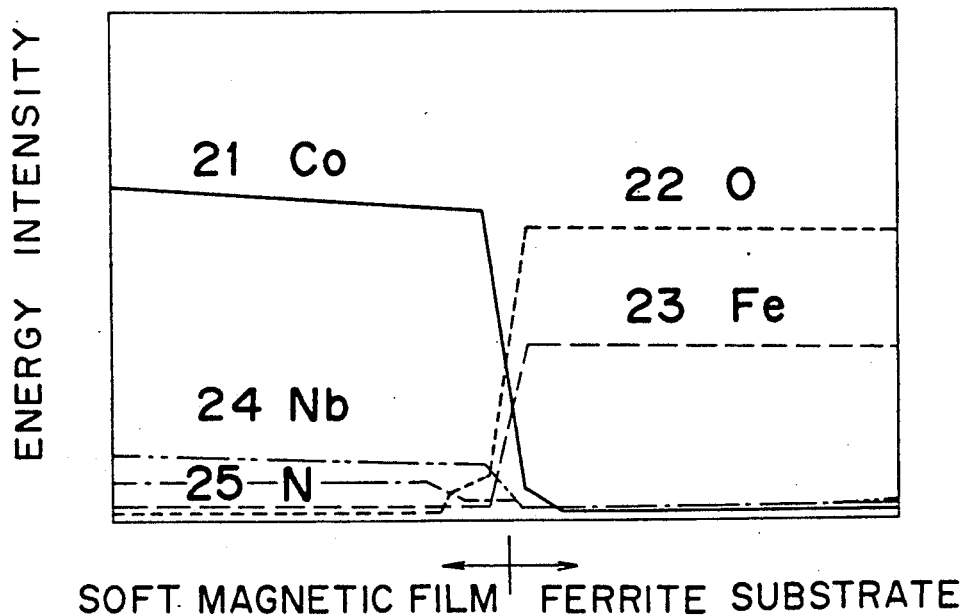
FIG. 6 is a graphical representation showing the distribution condition of each element of the soft magnetic film of FIG. 5 in the film thickness direction thereof measured by an Auger electron spectral analysis after the soft magnetic film is annealed at 550° C. for an hour.
Figure 7:
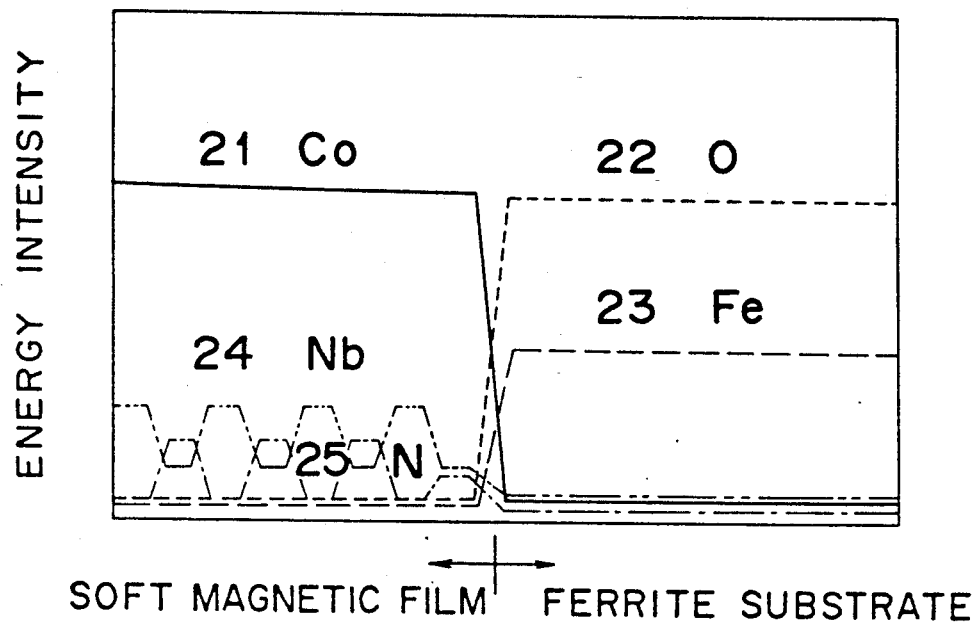
FIG. 7 is a graphical representation showing the distribution condition of each element of a soft magnetic film in the film thickness direction thereof measured by an Auger electron spectral analysis immediately after the soft magnetic film is formed, in which the composition ratio of nitrogen of a first layer adjacent to ferrite is less than the average composition ratio of nitrogen of the soft magnetic film.
Figure 8:
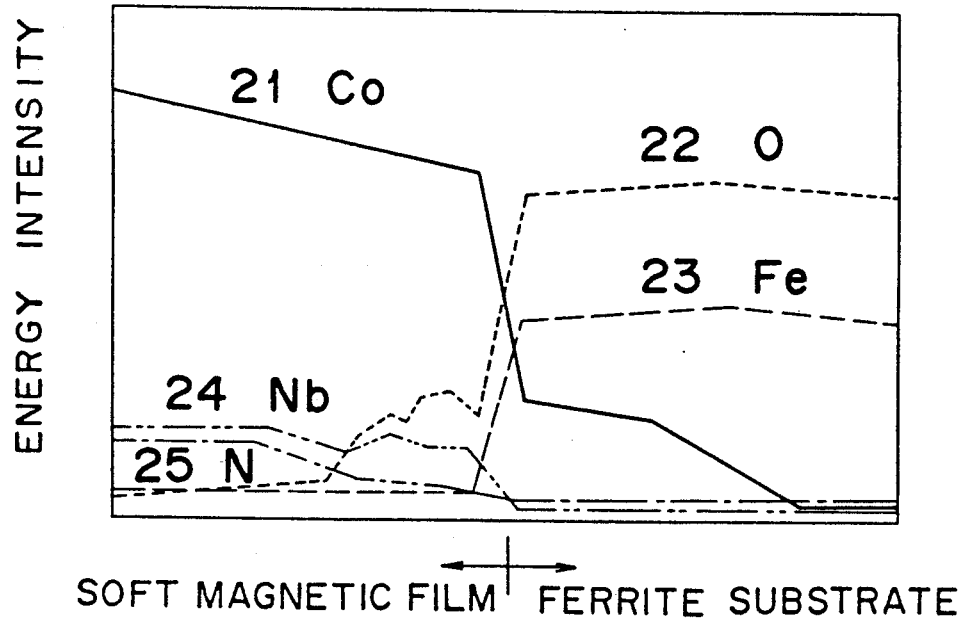
FIG. 8 is a graphical representation showing the distribution condition of each element of the soft magnetic film of FIG. 7 in the film thickness direction thereof measured by an Auger electron spectral analysis after the soft magnetic film is annealed at 550° C. for an hour.
Figure 9:
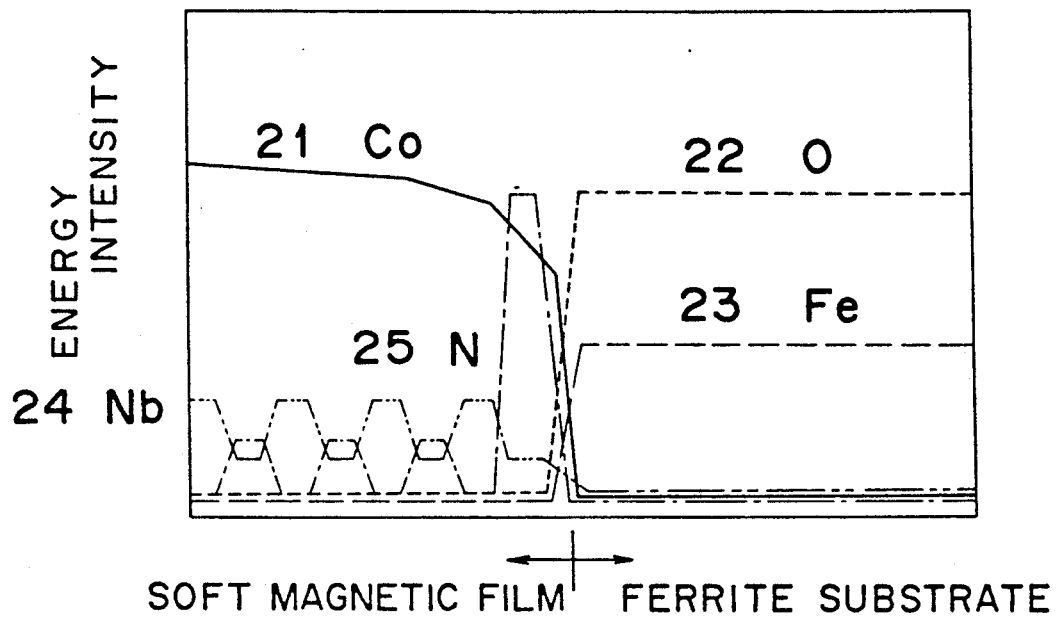
FIG. 9 is a graphical representation showing the distribution condition of each element of a soft magnetic film in the film thickness direction thereof measured by an Auger electron spectral analysis immediately after the soft magnetic film is formed, in which the composition ratio of nitrogen of a first layer adjacent to ferrite is 50%.
Figure 10:
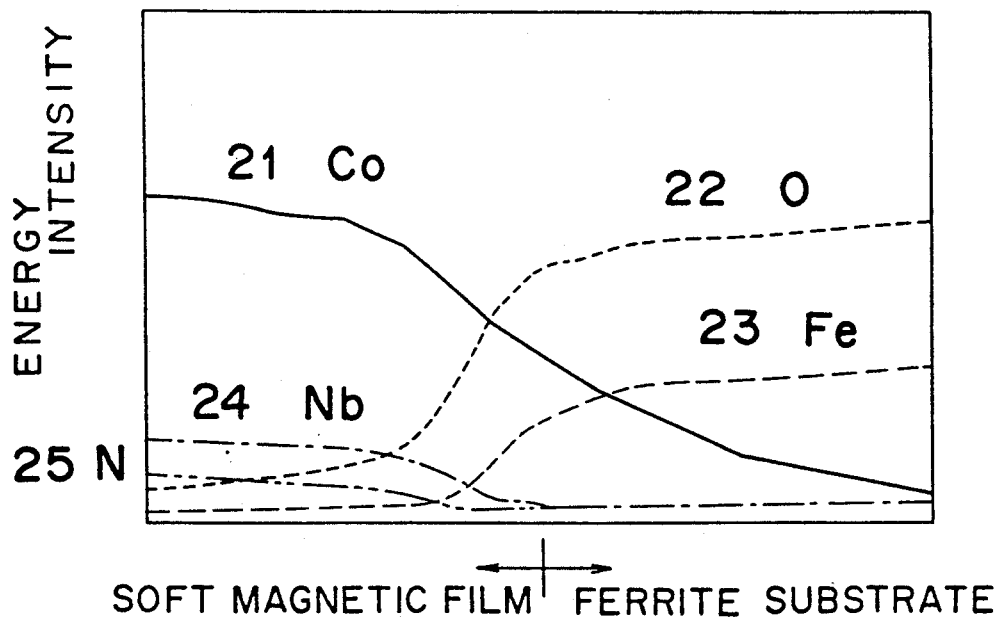
FIG. 10 is a graphical representation showing the distribution condition of each element of the soft magnetic film of FIG. 9 in the film thickness direction thereof measured by an Auger electron spectral analysis after the soft magnetic film is annealed at 550° C. for an hour.

In Table 5, a magnetic head comprising the nitrogen-abundant layer composing the first layer containing nitrogen at 11% is denoted by reference numeral 9. A magnetic head comprising the first layer containing nitrogen at 4% is denoted by reference numeral 10. A magnetic head comprising the first layer containing nitrogen at 50% is denoted by reference numeral 11. FIGS. 5, 7, and 9 show the distribution condition of each element of the metallic magnetic film in the film thickness direction thereof in the vicinity of boundary region between ferrite and the metallic magnetic film measured by Auger electron spectral analysis before the gap of each head 9, 10, and 11 is formed. FIGS. 6, 8, and 10 show the distribution condition of each element of the metallic magnetic film in the film thickness direction thereof in the vicinity of boundary region between the metallic magnetic film and the ferrite measured by Auger electron spectral analysis after each metallic magnetic film is heat-treated at 550° C. for an hour similarly to the gap formation.

In FIGS. 5 through 10, the abscissa indicates the position of a film in the film thickness direction and the ordinate shows the energy intensity of an Auger electron emitted from each observed element. Reference numerals 21, 22, 23, 24, and 25 of each figure indicate the energy intensity of the Auger electron of Co, O, Fe, Nb, and N.

As apparent from FIGS. 6, 8, and 10, the diffusion of each element between the soft magnetic film and the ferrite is suppressed if the composition of nitrogen contained in the first layer, which composes the metallic magnetic film, adjoining the ferrite is greater than the average composition ratio of nitrogen contained in the metallic magnetic film and 11% which is less than 50%.

As described above, first, a first metallic layer containing nitrogen is formed on magnetic ferrite, then, a second metallic layer not containing much nitrogen is formed on the first metallic layer, and thereafter, a third metallic layer containing nitrogen is formed on the second metallic layer, and the thickness (A) of the nitrogen-abundant layer is in the range from 3% to 50% in atomic percentage. Thus, a metallic magnetic film of a high saturation magnetic flux density and a high magnetic permeability can be applied to a parallel gap type MIG head which has a simple construction and is easy to produce with the diffusion of elements between the soft magnetic film and ferrite suppressed. Thus, a MIG head is influenced in a small degree by the pseudo gap in its operation.

EXAMPLE 5

Figure 11:
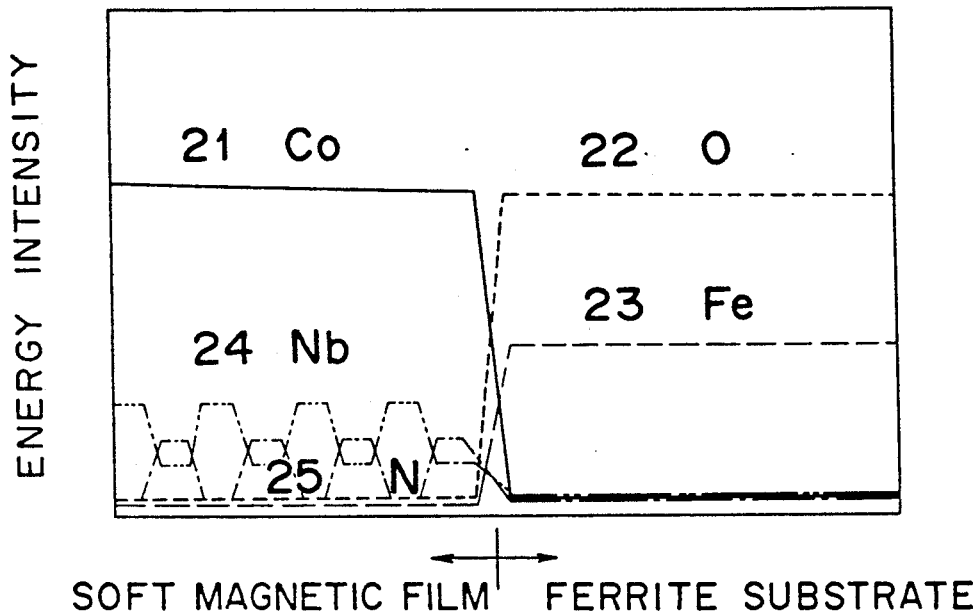
FIG. 11 is a graphical representation showing the distribution condition of each element of a soft magnetic film in the film thickness direction thereof measured by an Auger electron spectral analysis immediately after the soft magnetic film is formed on ferrite in such a condition that a non-nitride layer is first formed.
Figure 12:
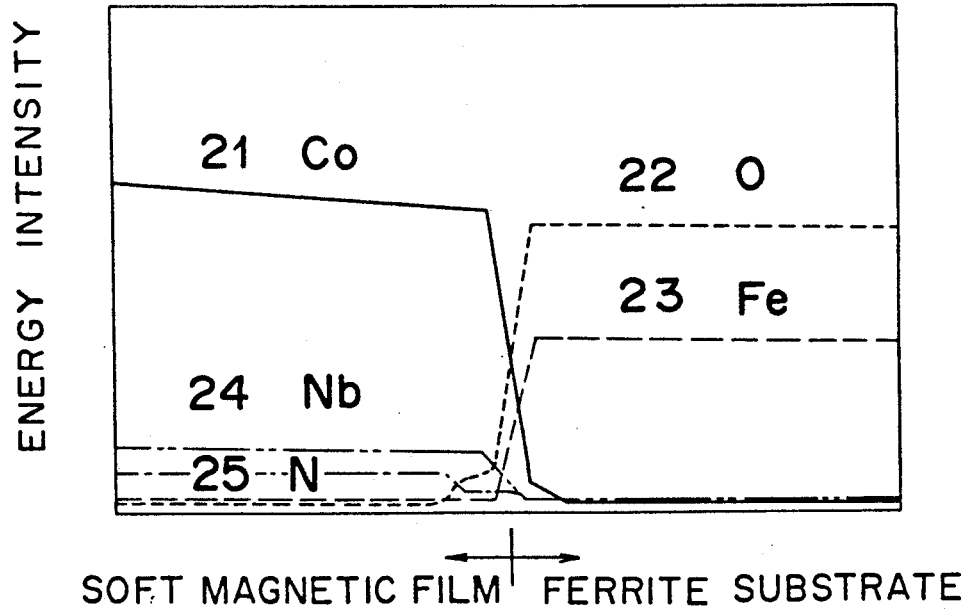
FIG. 12 is a graphical representation showing the distribution condition of each element of a soft magnetic film in the film thickness direction thereof measured by an Auger electron spectral analysis after the soft magnetic film is formed on ferrite in such a condition that a non-nitride layer is first formed and annealed at 550° C. for an hour.

In the magnetic head, shown in FIG. 2, manufactured by using CoNbZr as the target of the metallic magnetic material, nitrogen is supplied to the entire metallic magnetic film 13 and stopped repeatedly alternately in the same cycle. This magnetic head is denoted by reference numeral 12. FIG. 11 shows the distribution condition of each element of the metallic magnetic film in the film thickness direction thereof in the vicinity of boundary region between ferrite and the metallic magnetic film measured by Auger electron spectral analysis before the gap of the magnetic head 12 is formed. FIG. 12 shows the distribution condition of each element of the metallic magnetic film in the film thickness direction thereof in the vicinity of boundary region between the metallic magnetic film and the ferrite measured by Auger electron spectral analysis after each metallic magnetic film is heat-treated at 550° C. for an hour similarly to the gap formation.

Figure 13:
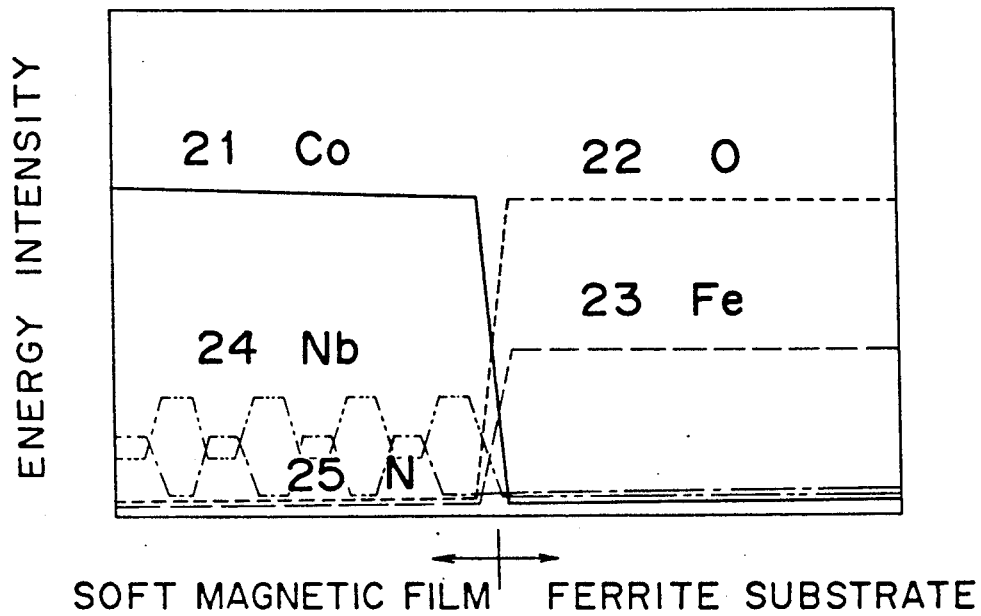
FIG. 13 is a graphical representation showing the distribution condition of each element of a soft magnetic film in the film thickness direction thereof measured by an Auger electron spectral analysis immediately after the soft magnetic film is formed on ferrite in such a condition that a nitride layer is first formed.
Figure 14:
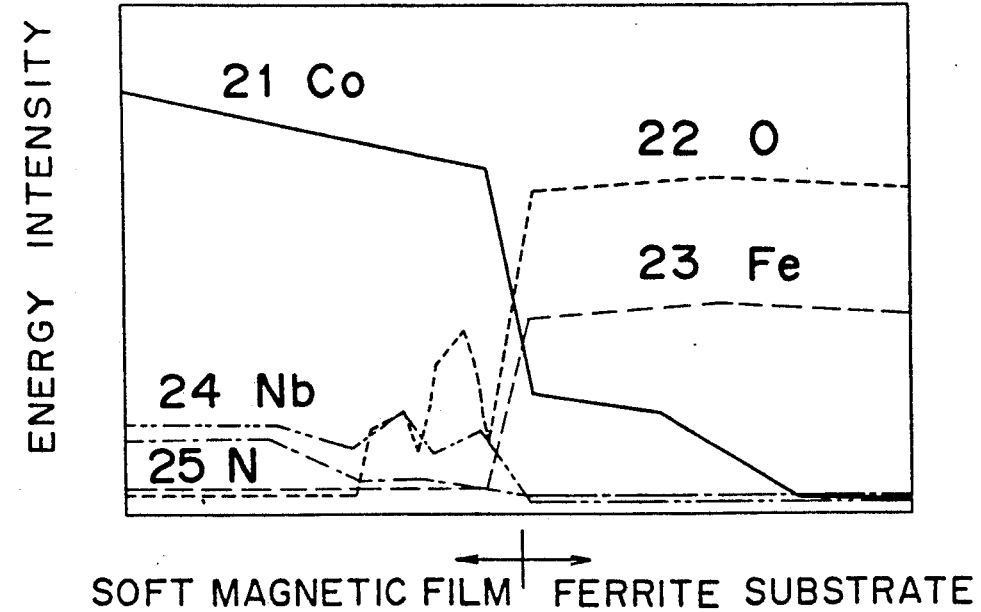
FIG. 14 is a graphical representation showing the distribution condition of each element of a soft magnetic film in the film thickness direction thereof measured by an Auger electron spectral analysis after the soft magnetic film is formed on ferrite in such a condition that a nitride layer is first formed and annealed at 550° C. for an hour.

As a comparative example of the magnetic head 12, first, a metallic film containing nitrogen is formed on magnetic ferrite by using the same target and then, nitrogen is supplied to the entire metallic magnetic film 13 and stopped repeatedly, alternately in the same cycle. This magnetic head is denoted by reference numeral 13. FIG. 13 shows the distribution condition of each element of the metallic magnetic film in the film thickness direction thereof in the vicinity of boundary region between ferrite and the metallic magnetic film measured by Auger electron spectral analysis before the gap of the magnetic head 13 is formed. FIG. 14 shows the distribution condition of each element of the metallic magnetic film in the film thickness direction thereof in the vicinity of boundary region between the metallic magnetic film and the ferrite measured by Auger electron spectral analysis after each metallic magnetic film is heat-treated at 550° C. for an hour similarly to the gap formation.

In these two magnetic heads 12 and 13, the nitrogen-abundant layer contains Nb, Zr, N, and Co at 3.5%, 2%, 11%, and the rest, respectively in atomic percentage and the thickness of each nitrogen-abundant layer is 27 nm immediately after it is formed. The nitrogen-scarce layer contains Nb, Zr, and Co at 8.5%, 3%, and the rest, respectively in atomic percentage and the thickness of each nitrogen-scarce layer is 27 nm, and the entire thickness of the metallic magnetic film 13 is 5.4 μm immediately after it is formed. In FIGS. 11 through 14, the abscissa indicates the position of a film in the film thickness direction and the ordinate shows the energy intensity of an Auger electron emitted from each observed element. Reference numerals 21, 22, 23, 24, and 25 of each figure indicate the energy intensity of the Auger electron of Co, O, Fe, Nb, and N.

Although the clear distinction between the nitrogen-abundant layer and the nitrogen-scarce layer is eliminated after a heat treatment is performed, but as apparent from FIGS. 12 and 14, the diffusion degree of each element between the metallic magnetic film and the ferrite is smaller when the nitrogen-abundant layer is formed on the ferrite prior to the formation of the nitrogen-scarce layer than when the nitrogen-scarce layer is formed on the ferrite prior to the formation of the nitrogen-abundant layer.

Table 6 shows the pseudo outputs and waving in frequency response at a magnetomotive force of 550 mA.turn and a writing frequency of 65 kHz when the relative speed of a magnetic recording medium relative to the magnetic heads 12 and 13 is 3.1 m/s.

TABLE 6

| head | head 12 | head 13 |
|---|---|---|
| pseudo signal (dB) | −38 | −24 |
| waving in frequency response (dB p-p) | −0.6 | 2.4 |

Table 6 indicates that the influence of the pseudo gap on the operation of the magnetic heads is smaller when the nitrogen-abundant layer is formed on the ferrite prior to the formation of the nitrogen-scarce layer than when the nitrogen-scarce layer is formed on the ferrite prior to the formation of the nitrogen-abundant layer.

As described above, in forming the metallic magnetic film in which at least the composition ratio of nitrogen is altered in the film thickness direction, first, a first metallic layer containing nitrogen is formed on magnetic ferrite, then, a second metallic layer not containing much nitrogen is formed on the first metallic layer, and thereafter, a third metallic layer containing nitrogen is formed on the second metallic layer. Thus, the diffusion of elements between the metallic magnetic film and ferrite can be suppressed. Accordingly, the influence of the pseudo gap on the operation of a parallel gap type MIG head having a simple construction and being easy to produce is made to be small by composing the magnetic head of this metallic magnetic film.

EXAMPLE 6

The manufacturing method of example 6 is the same as that of example 5 except that a magnetic head is manufactured by using an alloy of (M) and (T) as the target of the metallic magnetic material. In the above, (M) denotes one metal or more selected from Fe, Co, Ni, and Mn and (T) denotes one element or more selected from Nb, Zr, Ti, Ta, Hf, Cr, W, and Mo.

Similarly to Example 5, two types of magnetic heads are manufactured by using these targets. In one of the magnetic heads, the nitrogen-abundant layer is formed on ferrite prior to the formation of the nitrogen-scarce layer. In the other magnetic head, the nitrogen-scarce layer is formed on the ferrite prior to the formation of the nitrogen-abundant layer. Table 7 shows the pseudo outputs and the dependency of the waving in frequency response on composition ratio at a magnetomotive force of 550 mA.turn and a writing frequency of 65 kHz when the relative speed of a magnetic recording medium relative to these magnetic heads is 3.1 m/s.

TABLE 7

| composition excluding nitrogen | first layer | pseudo output (dB) | swell of frequency characteristic (dB p-p) |
|---|---|---|---|
| CoNb | nitrogen abundant layer | −42 | 0.4 |
|  | nitrogen scarce layer | −24 | 2.3 |
| CoZr |  | −36 | 0.8 |
|  |  | −23 | 2.6 |
| CoNbZr |  | −38 | 0.6 |
|  |  | −24 | 2.4 |
| CoNbTi |  | −38 | 0.5 |
|  |  | −22 | 2.9 |
| CoNbTa |  | −37 | 0.6 |
|  |  | −22 | 2.8 |
| CoNbHf |  | −37 | 0.7 |
|  |  | −19 | 3.4 |
| CoNbCr |  | −36 | 0.7 |
|  |  | −20 | 2.9 |
| CoNbW |  | −37 | 0.6 |
|  |  | −19 | 3.0 |
| CoNbMo |  | −36 | 0.6 |
|  |  | −18 | 3.5 |
| FeNb |  | −38 | 0.7 |
|  |  | −19 | 3.3 |
| FeZr |  | −39 | 0.4 |
|  |  | −19 | 3.2 |
| FeNbZr |  | −37 | 0.5 |
|  |  | −18 | 3.4 |
| FeNiNb |  | −35 | 0.9 |
|  |  | −17 | 3.7 |

TABLE 7-continued

| composition excluding nitrogen | first layer | pseudo output (dB) | swell of frequency characteristic (dB p-p) |
|---|---|---|---|
| FeMnNb |  | −34 | 1.0 |
|  |  | −17 | 4.2 |

As indicated in Table 7, in the metallic magnetic film consisting of metallic material of (M), namely, one metal or more selected from Fe, Co, Ni, and Mn and (T), namely, one element or more selected from Nb, Zr, Ti, Ta, Hf, Cr, W, and Mo, the influence of the psuedo gap on the operation of a magnetic head in which the nitrogen-abundant layer has been formed on the magnetic ferrite core prior to the formation of the nitrogen-scarce layer is less than that of a magnetic head in which the nitrogen-scarce layer is formed on the magnetic ferrite core before the nitrogen-abundant layer is formed.

As described above, in forming the metallic magnetic film, comprising (M) and (T), in which at least the composition ratio of nitrogen is altered in the film thickness direction, first, a first metallic layer containing nitrogen is formed on magnetic ferrite, then, a second metallic layer not containing much nitrogen is formed on the first metallic layer, and thereafter, a third metallic layer containing nitrogen is formed on the second metallic layer. Thus, the diffusion of elements between the metallic magnetic film and ferrite can be suppressed. Accordingly, the influence of the pseudo gap on the operation of a parallel gap type MIG head having a simple construction and being easy to produce is made to be small by composing the magnetic head of this metallic magnetic film.

In the above, (M) denotes one metal or more selected from Fe, Co, Ni, and Mn and (T) denotes one element or more selected from Nb, Zr, Ti, Ta, Hf, Cr, W, and Mo.

EXAMPLE 7

The manufacturing method of example 7 is the same as that of example 5 except that a magnetic head is manufactured by using an alloy of (M), (T), and (U) as the target of the metallic magnetic material. In the above, (M) denotes one metal or more selected from Fe, Co, Ni, and Mn; (T) denotes one element or more selected from Nb, Zr, Ti, Ta, Hf, Cr, W, Mo, Re, and Ru; and (U) denotes one element or more selected from B, Si, Ge, and Al.

Similarly to Example 5, two types of magnetic heads are manufactured by using these targets. In one of the magnetic heads, the nitrogen-abundant layer is formed on ferrite prior to the formation of the nitrogen-scarce layer. In the other magnetic head, the nitrogen-scarce layer is formed on the ferrite prior to the formation of the nitrogen-abundant layer. Table 8 shows the pseudo outputs and the dependency of the waving in frequency response on composition ratio at a magnetomotive force of 550 mA.turn and a writing frequency of 65 kHz when the relative speed of a magnetic recording medium relative to these magnetic heads is 3.1 m/s.

TABLE 8

| first layer | pseudo output (dB) | | waving (dB p-p) | |
| --- | --- | --- | --- | --- |
| | nitride layer | nonnitride layer | nitride layer | nonnitride layer |
| FeNbB | −36 | −18 | 0.8 | 3.2 |
| FeNbSiB | −35 | −19 | 0.9 | 3.3 |
| FeNbGe | −35 | −19 | 0.8 | 3.3 |
| FeNbAl | −35 | −18 | 0.9 | 3.4 |
| CoNbZrB | −37 | −24 | 0.6 | 2.6 |

TABLE 9

| first layer | pseudo output (dB) | | waving (dB p-p) | |
| --- | --- | --- | --- | --- |
| | nitride layer | nonnitride layer | nitride layer | nonnitride layer |
| FeNbCo | −34 | −19 | 1.0 | 3.0 |
| FeZrCo | −35 | −20 | 0.9 | 2.9 |
| FeTiCo | −35 | −19 | 0.8 | 2.8 |
| FeTaCo | −34 | −19 | 0.8 | 2.9 |
| FeHfCo | −35 | −18 | 0.7 | 3.2 |
| MnNbCo | −33 | −17 | 1.1 | 3.5 |

As indicated in Table 8, in the metallic magnetic film consisting of an alloy of (M), namely, one metal or more selected from Fe, Co, Ni, and Mn; (T), namely, one element or more selected from Nb, Zr, Ti, Ta, Hf, Cr, W, Mo, Re, and Ru; and (U), namely, B, Si, Ge, and Al, the influence of the pseudo gap on the operation of a magnetic head in which the nitrogen-abundant layer has been formed on the magnetic ferrite core prior to the formation of the nitrogen-scarce layer is less than that of a magnetic head in which the nitrogen-scarce layer is formed on the magnetic ferrite core before the nitrogen-abundant layer is formed.

As described above, in forming the metallic magnetic film, comprising (M), (T), and (U) in which at least the composition ratio of nitrogen is altered in the film thickness direction, first, a first metallic layer containing nitrogen is formed on magnetic ferrite, then, a second metallic layer not containing much nitrogen is formed on the first metallic layer, and thereafter, a third metallic layer containing nitrogen is formed on the second metallic layer. Thus, the diffusion of elements between the metallic magnetic film and ferrite can be suppressed. Accordingly, the influence of the pseudo gap on the operation of a parallel gap type MIG head having a simple construction and being easy to produce is made to be small by composing the magnetic head of this metallic magnetic film. In the above, (M) denotes one metal or more selected from Fe, Co, Ni, and Mn; (T) denotes one element or more selected from Nb, Zr, Ti, Ta, Hf, Cr, W, Mo, Re, and Ru; and (U) denotes one element or more selected from B, Si, Ge, and Al.

EXAMPLE 8

The manufacturing method of example 8 is the same as that of example 5 except that a magnetic head is manufactured by using an alloy of (M), (T), and Co as the target of the metallic magnetic material. In the above, (M) denotes one metal or more selected from Fe and Mn; and (T) denotes one element or more selected from Nb, Zr, Ti, Ta, and Hf.

Similarly to Example 5, two types of magnetic heads are manufactured by using these targets. In one of the magnetic heads, the nitrogen-abundant layer is formed on ferrite prior to the formation of the nitrogen-scarce layer. In the other magnetic head, the nitrogen-scarce layer is formed on the ferrite prior to the formation of the nitrogen-abundant layer. Table 9 shows the pseudo outputs and the dependency of the waving in frequency response on composition ratio at a magnetomotive force of a 550 mA.turn and a writing frequency of 65 kHz when the relative speed of a magnetic recording medium relative to these magnetic heads is 3.1 m/s.

As indicated in Table 9, in the metallic magnetic film consisting of an alloy of (M), namely, one metal or more selected from Fe and Mn; (T), namely, one element or more selected from Nb, Zr, Ti, Ta, and Hf; and Co, the influence of the pseudo gap on the operation of a magnetic head in which the nitrogen-abundant layer has been formed on the magnetic ferrite core prior to the formation of the nitrogen-scarce layer is less than that of a magnetic head in which the nitrogen-scarce layer is formed on the magnetic ferrite core before the nitrogen-abundant layer is formed.

As described above, in forming the metallic magnetic film, comprising (M), (T), and Co in which at least the composition ratio of nitrogen is altered in the film thickness direction, first, a first metallic layer containing nitrogen is formed on magnetic ferrite, then, a second metallic layer not containing much nitrogen is formed on the first metallic layer, and thereafter, a third metallic layer containing nitrogen is formed on the second metallic layer. Thus, the diffusion of elements between the metallic magnetic film and ferrite can be suppressed. Accordingly, the influence of the pseudo gap on the operation of a parallel gap type MIG head having a simple construction and being easy to produce is made to be small by composing the magnetic head of this metallic magnetic film. In the above, (M) denotes one metal or more selected from Fe and Mn; (T) denotes one element or more selected from Nb, Zr, Ti, Ta, and Hf.

EXAMPLE 9

The manufacturing method of example 9 is the same as that of example 5 except that a magnetic head is manufactured by using an alloy of (M), (T), and (U) as the target of the metallic magnetic material. In the above, (M) denotes one metal or more selected from Fe, Fe-Co, and Ni; (T) denotes one element or more selected from Nb, Ta, Nb-Ta; and (U) denotes one element or more selected from B, Si-B, and Ge-B.

Similarly to Example 5, two types of magnetic heads are manufactured by using these targets. In one of the magnetic heads, the nitrogen-abundant layer is formed on ferrite prior to the formation of the nitrogen-scarce layer. In the other magnetic head, the nitrogen-scarce layer is formed on the ferrite prior to the formation of the nitrogen-abundant layer. Table 10 shows the pseudo outputs and the dependency of the waving in frequency response on composition ratio at a magnetomotive force of 550 mA.turn and a writing frequency of 65 kHz when the relative speed of a magnetic recording medium relative to these magnetic heads is 3.1 m/s.

TABLE 10

| first layer | pseudo output (dB) nitride layer | pseudo output (dB) nonnitride layer | waving (dB p-p) nitride layer | waving (dB p-p) nonnitride layer |
| --- | --- | --- | --- | --- |
| FeNbTaGeB | −30 | −20 | 1.0 | 2.9 |
| FeCoNbGeB | −32 | −21 | 0.7 | 2.7 |
| FeCoTaB | −29 | −19 | 0.8 | 2.9 |
| NiNbSiB | −33 | −17 | 1.2 | 4.0 |
| NiNbGeB | −33 | −15 | 1.4 | 4.4 |

As indicated in Table 10, in the metallic magnetic film consisting of an alloy of (M), namely, one metal or more selected from Fe and Fe-Co, and NI; (T), namely, one element or more selected from Nb, Ta, and Nb-Ta; and (U), namely, one element or more selected from B, Si-B, and Ge-B, the influence of the pseudo gap on the operation of a magnetic head in which the nitrogen-abundant layer has been formed on the magnetic ferrite core prior to the formation of the nitrogen-scarce layer is less than that of a magnetic head in which the nitrogen-scarce layer is formed on the magnetic ferrite core before the nitrogen-abundant layer is formed.

As described above, in forming the metallic magnetic film, comprising (M), (T), and (U) in which at least the composition ratio of nitrogen is altered in the film thickness direction, first, a first metallic layer containing nitrogen is formed on magnetic ferrite, then, a second metallic layer not containing much nitrogen is formed on the first metallic layer, and thereafter, a third metallic layer containing nitrogen is formed on the second metallic layer. Thus, the diffusion of elements between the metallic magnetic film and ferrite can be suppressed. Accordingly, the influence of the pseudo gap on the operation of a parallel gap type MIG head having a simple construction and being easy to produce is made to be small by composing the magnetic head of this metallic magnetic film. In the above, (M) denotes one metal or more selected from Fe, Fe-Co, and Ni; (T) denotes one element or more selected from Nb, Ta, and Nb-Ta; and (U) denotes one element or more selected from B, Si, and C.

EXAMPLE 10

The manufacturing method of example 10 is the same as that of example 5 except that a magnetic head is manufactured by using an alloy of (M), (T), and (U) as the target of the metallic magnetic material. In the above, (M) denotes one metal or more selected from Fe, Fe-Co, Fe-Ni, and Fe-Co-Ni, which are mainly composed of Fe respectively; (T) denotes one element or more selected from Nb, Ta, Zr, and Ti; and (U) denotes one element or more selected from B, Si, and C.

Similarly to Example 5, two types of magnetic heads are manufactured by using these targets. In one of the magnetic heads, the nitrogen-abundant layer is formed on ferrite prior to the formation of the nitrogen-scarce layer. In the other magnetic head, the nitrogen-scarce layer is formed on the ferrite prior to the formation of the nitrogen-abundant layer. Table 11 shows the pseudo outputs and the dependency of the waving in frequency response on composition ratio at a magnetomotive force of 550 mA.turn and a writing frequency of 65 kHz when the relative speed of a magnetic recording medium relative to these magnetic heads is 3.1 m/s.

TABLE 11

| first layer | pseudo output (dB) nitride layer | pseudo output (dB) nonnitride layer | waving (dB p-p) nitride layer | waving (dB p-p) nonnitride layer |
| --- | --- | --- | --- | --- |
| FeCoNbC | −36 | −22 | 0.6 | 2.8 |
| FeNiNbC | −36 | −21 | 0.6 | 2.4 |
| FeCoNiNbB | −34 | −20 | 0.9 | 2.7 |
| FeCoNiZrB | −36 | −21 | 0.8 | 2.7 |
| FeCoTaB | −35 | −18 | 1.0 | 3.3 |
| FeCoTaSi | −34 | −19 | 1.3 | 3.8 |
| FeNiTiB | −34 | −19 | 1.2 | 3.8 |

As indicated in Table 11, in the metallic magnetic film consisting of an alloy of (M), namely, one metal or more selected from Fe, Fe-Co, Fe-Ni, and Fe-Co-Ni, which are mainly composed of Fe respectively, and NI; (T), namely, one element or more selected from Nb, Ta, Zr, and Ti; and (U), namely, one element or more selected from B, Si, and C, the influence of the pseudo gap on the operation of a magnetic head in which the nitrogen-abundant layer has been formed on the magnetic ferrite core prior to the formation of the nitrogen-scarce layer is less than that of a magnetic head in which the nitrogen-scarce layer is formed on the magnetic ferrite core before the nitrogen-abundant layer is formed.

As described above, in forming the metallic magnetic film, comprising (M), (T), and (U) in which at least the composition ratio of nitrogen is altered in the film thickness direction, first, a first metallic layer containing nitrogen is formed on magnetic ferrite, then, a second metallic layer not containing much nitrogen is formed on the first metallic layer, and thereafter, a third metallic layer containing nitrogen is formed on the second metallic layer. Thus, the diffusion of elements between the metallic magnetic film and ferrite can be suppressed. Accordingly, the influence of the pseudo gap on the operation of a parallel gap type MIG head having a simple construction and being easy to produce is made to be small by composing the magnetic head of this metallic magnetic film. In the above, (M) denotes one metal or more selected from Fe, Fe-Co, Fe-Ni, and Fe-Co-Ni, which are mainly composed of Fe respectively; (T) denotes one element or more selected from Nb, Ta, Zr, and Ti; and (U) denotes one element or more selected from B, Si, and C.

In all the above examples, the gap of each magnetic head is formed at 550° C., but may be formed at a different temperature depending on the material of a mold glass. In examples 5, 6, 7, 8, 9, and 10, the thickness of each of the nitrogen-abundant layer 14 and the nitrogen-scarce layer 15 is 270Å and entire thickness of the soft magnetic film 13 is 5.4 μm, but may be in a different thickness provided that they have a favorable soft magnetic characteristic.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for manufacturing a metal-in-gap magnetic head in which a soft magnetic film is provided in a gap of a core made of magnetic ferrite comprising the steps of:

forming a first layer, which comprises a metallic magnetic film containing nitrogen, on said core;

forming a second layer, which comprises a metallic magnetic film which is nitrogen free or contains nitrogen in an amount less than said first layer, on said first layer; and forming a third layer, which comprises a metallic magnetic film containing nitrogen in an amount more than said second layer, on said second layer.

2. A method for manufacturing a magnetic head as defined in claim 1, wherein a thickness (A) of said first and third layers and a thickness (B) of said second layer are defined as:

5 nm < A < 300 nm 5 nm < B < 300 nm

3. A method for manufacturing a magnetic head as defined in claim 1, wherein a nitrogen concentration (C) of said first and third layers is defined in atomic percentage as:

3% < C < 50%

4. A method for manufacturing a magnetic head as defined in claim 1, wherein a thickness (A) of said first and third layers and a thickness (B) of said second layer are defined as:

5 nm < A < 300 nm 5 nm < B < 300 nm and a nitrogen concentration (C) of said first and third layers is defined in atomic percentage as:

3% < C < 50%

5. A method for manufacturing a magnetic head as defined in claim 1, wherein said second layer contains no nitrogen or a slight amount of nitrogen and the thickness thereof is more than 35Å and thinner than a double thickness of said first layer.

6. A method for manufacturing a metal-in-gap magnetic head, wherein a gap of a ferrite core is provided with a film selected from (1) a first soft magnetic film consisting of (a) alloy layers selected from the group consisting of amorphous and microcrystalline alloy layers and (b) nitride layers of said alloy, which are alternately laminated to each other, and (2) a second soft magnetic film consisting of alloy layers selected from the group consisting of amorphous and microcrystalline nitride alloy layers in which at least a composition ratio of nitrogen is altered in a thickness direction of said second soft magnetic film, wherein a layer adjacent to the ferrite consists of a nitride layer or contains a great amount of nitrogen.

7. A method for manufacturing a magnetic head as defined in claim 6, wherein said first soft magnetic film consists of layers of an alloy of (M) and (T) and nitride layers of said alloy of (M) and (T), which are alternately laminated to each other, and wherein said second soft magnetic film consists of layers of an alloy of (M), (T), and nitrogen, wherein (M) denotes one metal or more selected from Fe, Co, Ni, and Mn; (T) denotes one element or more selected from Nb, Zr, Ti, Ta, Hf, Cr, W, and Mo.

8. A method for manufacturing a magnetic head as defined in claim 6, wherein said first soft magnetic film consists of layers of an alloy of (M), (T), and (U) and nitride layers of said alloy of (M), (T), and (U), which are alternately laminated to each other, and wherein, and said second soft magnetic film consists of layers of an alloy of (M), (T), (U), and nitrogen, wherein (M) denotes one metal or more selected from Fe, Co, Ni, and Mn; (T) denotes one element or more selected from Nb, Zr, Ti, Ta, Hf, Cr, W, Mo, Re, and Ru; and (U) denotes one element or more selected from B, Si, Ge, Al, and C.

9. A method for manufacturing a magnetic head as defined in claim 6, wherein said first soft magnetic film consists of layers of an alloy of (M), (T), and Co and nitride layers of said alloy of (M), (T), and Co, which are alternately laminated to each other, and wherein, said second soft magnetic film consists of layers of an alloy of (M), (T), Co, and nitrogen, wherein (M) denotes one metal or more selected from Fe and Mn; and (T) denotes one element or more selected from Nb, Zr, Ti, Ta, and Hf.

10. A method for manufacturing a magnetic head as defined in claim 6, wherein said first soft magnetic film consists of layers of an alloy of (M), (T), and (U) and nitride layers of said alloy of (M), (T), and (U), which are alternately laminated to each other, and wherein, said second soft magnetic film consists of layers of an alloy of (M), (T), (U), and nitrogen, wherein (M) denotes one metal or more selected from Fe, Fe-Co, and Ni; (T) denotes one element or more selected from Nb, Ta, and Nb-Ta; and (U) denotes one element or more selected from B, Si-B, and Ge-B.

11. A method for manufacturing a magnetic head as defined in claim 6, wherein said first soft magnetic film consists of layers of an alloy of (M), (T), and (U) and nitride layers of said alloy of (M), (T), and (U), which are alternately laminated to each other, and wherein, said second soft magnetic film consists of layers of an alloy of (M), (T), (U), and nitrogen, wherein (M) denotes one metal or more selected from Fe, Fe-Co, Fe-Ni, and Fe-Co-Ni, which are mainly composed of Fe respectively; (T) denotes one element or more selected from Nb, Ta, Zr, and Ti; (U) denotes one element or more selected from B, Si, and C.

12. A method for manufacturing a metal-in-gap magnetic head in which a soft magnetic film is provided in a gap of a core made of magnetic ferrite and a reaction preventing layer is formed between said soft magnetic film and said core, comprising the steps of:

forming a first layer, which comprises a metallic film containing a first amount of nitrogen, on said core;

forming a second layer, which comprises a metallic film containing an amount of nitrogen, on said first layer; and forming a third layer, which comprises a metallic film containing nitrogen less than said first amount, on said second layer.

13. A method for manufacturing a magnetic head as defined in claim 12, wherein said reaction preventing layer consists of any one of silicon oxide, aluminum oxide and a platinum group element.

14. A method for manufacturing a magnetic head as defined in claim 12, wherein said reaction preventing layer consists of $SiO_2$.

* * * * *